(12) United States Patent
Demirhan et al.

(10) Patent No.: US 7,676,231 B2
(45) Date of Patent: Mar. 9, 2010

(54) METHODS AND APPARATUS FOR SELECTING COMMUNICATION CHANNELS BASED ON CHANNEL LOAD INFORMATION

(75) Inventors: Mustafa Demirhan, Hillsboro, OR (US); Mousumi Hazra, Beaverton, OR (US); Hsin-Yuo (York) Liu, Beaverton, OR (US); Nandakishore Kushalnagar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 11/106,185

(22) Filed: Apr. 13, 2005

(65) Prior Publication Data
US 2006/0234719 A1 Oct. 19, 2006

(51) Int. Cl.
*H04W 72/00* (2009.01)
*H04B 7/00* (2006.01)
*H04W 4/00* (2009.01)
*H04J 3/16* (2006.01)

(52) U.S. Cl. .............. 455/452.1; 455/464; 455/509; 370/329; 370/332; 370/341; 370/437

(58) Field of Classification Search ......... 455/437, 455/453, 426.1, 552.1, 553.1, 454, 434, 455, 455/450, 463, 464, 509, 515; 370/329, 330, 370/332, 338, 341, 431, 437
See application file for complete search history.

(56) References Cited

U.S. PATENT DOCUMENTS

| | | | | |
|---|---|---|---|---|
| 5,239,676 A | | 8/1993 | Strawczynski et al. | |
| 5,864,549 A | * | 1/1999 | Honkasalo et al. | 370/329 |
| 6,985,740 B2 | * | 1/2006 | Shyy et al. | 455/453 |
| 7,116,979 B2 | * | 10/2006 | Backes et al. | 455/434 |
| 7,174,170 B2 | * | 2/2007 | Steer et al. | 455/446 |
| 2003/0087645 A1 | * | 5/2003 | Kim et al. | 455/453 |
| 2003/0198202 A1 | | 10/2003 | Busch | |
| 2005/0215265 A1 | * | 9/2005 | Sharma | 455/453 |
| 2005/0227624 A1 | * | 10/2005 | Hiddink et al. | 455/453 |
| 2006/0178153 A1 | * | 8/2006 | Tenny et al. | 455/450 |

FOREIGN PATENT DOCUMENTS

| | | |
|---|---|---|
| EP | 1 133 208 A | 9/2001 |
| EP | 1 156 623 A | 11/2001 |
| EP | 1 284 583 A | 2/2003 |
| GB | 20453 | 10/1915 |

OTHER PUBLICATIONS

Adrian P. Stephens, et al. "Method and Apparatus to Select a Channel Using Performance Metrics", U.S. Appl. No. 10/637,335, filed Aug. 08, 2003.
Mustafa Demirhan, et al. "Channel Scanning in Wireless Networks", U.S. Appl. No. 10/835,941, filed Apr. 30, 2004.
Mustafa Demirhan, et al. "Systems and Methods of Distributed Self-Config . . . ", U.S. Appl. No. 10/890,950, filed Jul. 14, 2004.

* cited by examiner

*Primary Examiner*—Nick Corsaro
*Assistant Examiner*—Un C Cho
(74) *Attorney, Agent, or Firm*—Schwabe, Williamson & Wyatt, P.C.

(57) ABSTRACT

Embodiments of methods and apparatus for selecting communication channels based on channel load information are generally described herein. Other embodiments may be described and claimed.

25 Claims, 5 Drawing Sheets

METHODS AND APPARATUS FOR SELECTING COMMUNICATION CHANNELS BASED ON CHANNEL LOAD INFORMATION

TECHNICAL FIELD

The present disclosure relates generally to wireless communication systems, and more particularly, to methods and apparatus for selecting communication channels based on channel load information.

BACKGROUND

As wireless communication becomes more and more popular at offices, homes, schools, etc., the demand for resources may cause congestions and slowdowns in wireless environments. Based on the wireless communication protocol that is used, wireless communication devices, nodes, and/or networks may contend for limited bandwidth and/or channels for communication. In particular, there may not be enough channels for every independent network to communicate on a different channel. In one example, a wireless communication network operating in accordance with a wireless communication protocol based on the Institute of Electrical and Electronic Engineers (IEEE) 802.11a standard (IEEE std. 802.11a, published 1999) may have twelve channels for communication. In another example, a wireless communication network operating in accordance with a wireless communication protocol based on the IEEE 802.11b standard (IEEE std. 802.11b, published 1999) may have three channels for communication. Thus, wireless communication devices, nodes, and/or networks may need to share limited resources of wireless environments with each other.

DETAILED DESCRIPTION

In general, methods and apparatus for selecting communication channels based on channel load information are described herein. The methods and apparatus described herein are not limited in this regard.

Figure 1:
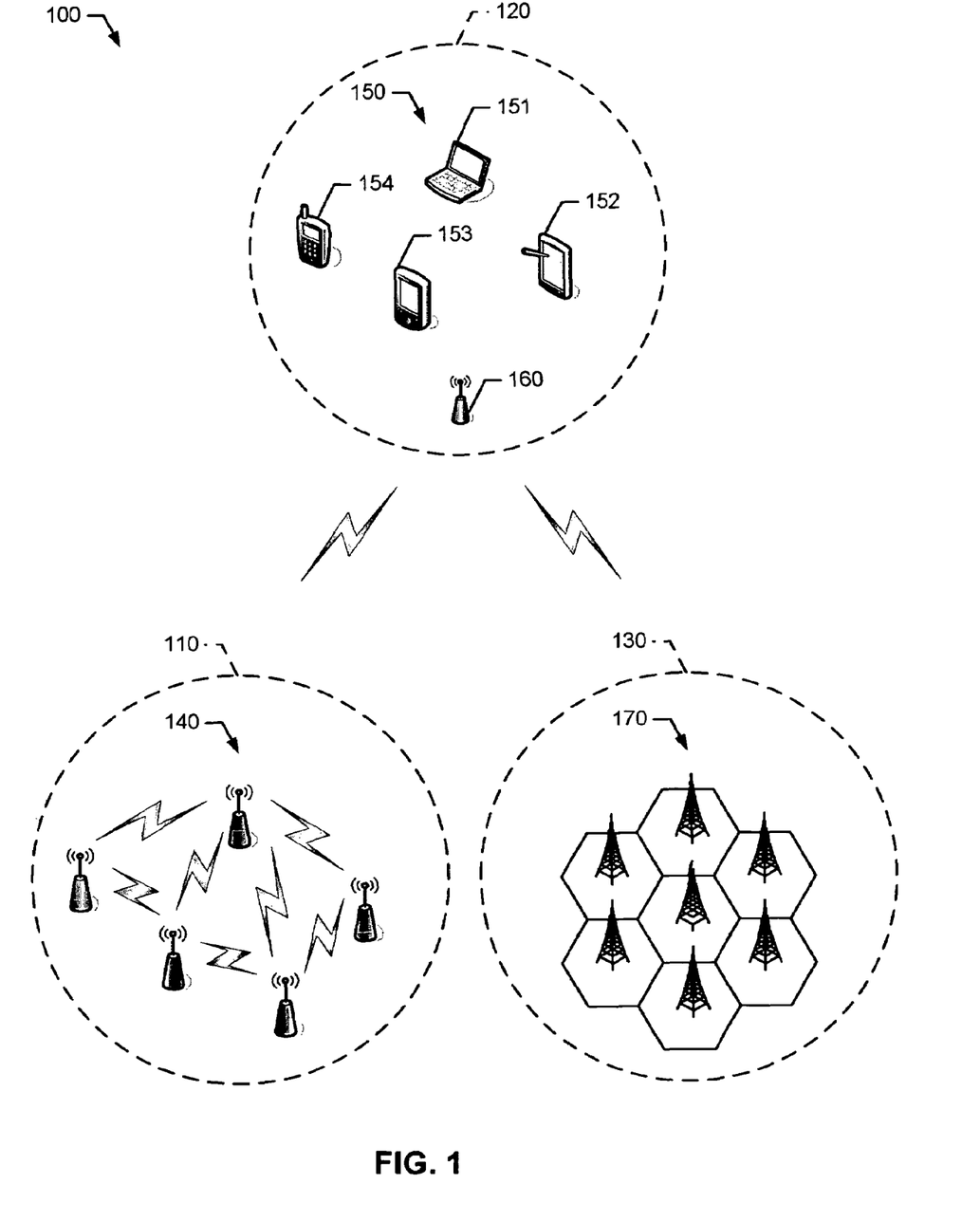
FIG. 1 is a schematic diagram representation of an example wireless communication system according to an embodiment of the methods and apparatus disclosed herein.

Referring to FIG. 1, an example wireless communication system 100 including one or more wireless communication networks, generally shown as 110, 120, and 130, is described herein. Although FIG. 1 depicts three wireless communication networks, the wireless communication system 100 may include additional or fewer wireless communication networks. Each of the wireless communication networks 110, 120, and 130 may include one or more communication nodes. In one example, the wireless communication network 110 may be a wireless mesh network. The wireless mesh network 110 may include two or more mesh points (MPs) 140. Although FIG. 1 depicts five MPs, the wireless mesh network 110 may include additional or fewer MPs. The MPs 140 may include access points, redistribution points, end points, and/or other suitable connection points for traffic flows via mesh paths.

The MPs 140 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with each other. For example, the MPs 140 may implement OFDM modulation to transmit large amounts of digital data by splitting a radio frequency signal into multiple small sub-signals, which in turn, are transmitted simultaneously at different frequencies. In particular, the MPs 140 may use OFDM modulation as described in the 802.xx family of standards developed by the Institute of Electrical and Electronic Engineers (IEEE) and/or variations and evolutions of these standards (e.g., 802.11, 802.15, 802.16, etc.) to communicate via the wireless links with each other (e.g., forward data within the wireless mesh network 110). The MPs 140 may also operate in accordance with other suitable wireless communication protocols that require very low power such as Bluetooth, Ultra Wideband (UWB), and/or radio frequency identification (RFID) to communicate with each other.

The wireless communication system 100 may also include wireless non-mesh networks. In one example, the wireless communication network 120 may be a basic service set (BSS) network. The BSS network 120 may include one or more stations 150, generally shown as 151, 152, 153, and 154. Although FIG. 1 depicts four stations, the BSS 120 may include additional or fewer stations. For example, the BSS 120 may include a laptop computer, a desktop computer, a handheld computer, a tablet computer, a cellular telephone, a pager, an audio/video device (e.g., an MP3 player), a game device, a navigation device (e.g., a GPS device), a monitor, a printer, a server, and/or other suitable wireless electronic devices.

The stations 150 may communicate via wireless links as described in the 802.xx family of standards developed by the Institute of Electrical and Electronic Engineers (IEEE) and/or variations and evolutions of these standards (e.g., 802.11, 802.15, 802.16, etc.). In one example, the stations 150 may operate in accordance with the 802.16 family of standards developed by IEEE to provide for fixed, portable, and/or mobile broadband wireless access (BWA) networks (e.g., the IEEE std. 802.16, published 2004). The stations 150 may also use direct sequence spread spectrum (DSSS) modulation (e.g., the IEEE std. 802.11b) and/or frequency hopping spread spectrum (FHSS) modulation (e.g., the IEEE std. 802.11). Further, the stations 150 may also operate in accordance with other suitable wireless communication protocols that require very low power such as Bluetooth, Ultra Wideband (UWB), and/or radio frequency identification (RFID) to communicate via wireless links. Alternatively, the stations 150 may communicate via wired links (not shown). For example, the stations 150 may use a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate. The methods and apparatus described herein are not limited in this regard.

The BSS network 120 may also include one or more communication nodes such as an access point (AP) 160 to provide wireless communication services to the stations 150. Although FIG. 1 depicts one AP, the BSS 120 may include additional APs. The AP 160 may receive and/or transmit data in connection with the stations 151, 152, 153, and/or 154. In addition to operating as an access point within the BSS network 120, the AP 160 may operate as a mesh AP (e.g., mesh AP 270 of FIG. 2). For example, the AP 160 may operate as an MP of the wireless mesh network 110 to communicate with the MPs 140. In particular, the AP 160 may receive and/or transmit data in connection with one or more of the plurality of MPs 140. As a result, the AP 160 may operate as a mesh AP to communicate with both the MPs 140 of wireless mesh network 110 and the stations 150 of the BSS network 120.

The wireless communication system 100 may also include a radio access network (RAN) 130 (e.g., a cellular network). The RAN 130 may include one or more base stations 170. Although FIG. 1 depicts seven base stations, the RAN 130 may include additional or fewer base stations. The base stations 170 may operate in accordance with one or more of several wireless communication protocols to communicate with wireless communication devices and/or nodes of the wireless mesh network 110, the BSS network 120, and/or other wireless communication networks. In one example, the base stations 170 of the RAN 130 may communicate with the stations 150 of the BSS network 120 directly (e.g., without using the AP 160). In particular, these wireless communication protocols may be based on analog, digital, and/or dual-mode communication system standards such as frequency division multiple access (FDMA)-based standards, the time division multiple access (TDMA)-based standards (e.g., Global System for Mobile Communications (GSM), General Packet Radio Services (GPRS), Enhanced Data GSM Environment (EDGE), Universal Mobile Telecommunications System (UMTS), etc.), code division multiple access (CDMA)-based standards, wideband CDMA (WCDMA)-based standards, variations and evolutions of these standards, and/or other suitable wireless communication standards. The methods and apparatus described herein are not limited in this regard.

Further, the wireless communication system 100 may include other wireless personal area network (WPAN) devices, wireless local area network (WLAN) devices, wireless metropolitan area network (WMAN) devices, and/or wireless wide area network (WWAN) devices such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system (not shown). Accordingly, the wireless mesh network 110 may be implemented to provide WPANs, WLANs, WMANs, WWANs, and/or other suitable wireless communication networks. Although certain examples have been described above, the scope of coverage of this disclosure is not limited thereto.

In general, wireless communication networks of a wireless communication system may select and communicate on a communication channel as described in detail below to minimize interference between each other and/or to reduce performance degradations and overload conditions in the wireless communication system. The methods and the apparatus described herein are not limited in this regard.

Figure 2:
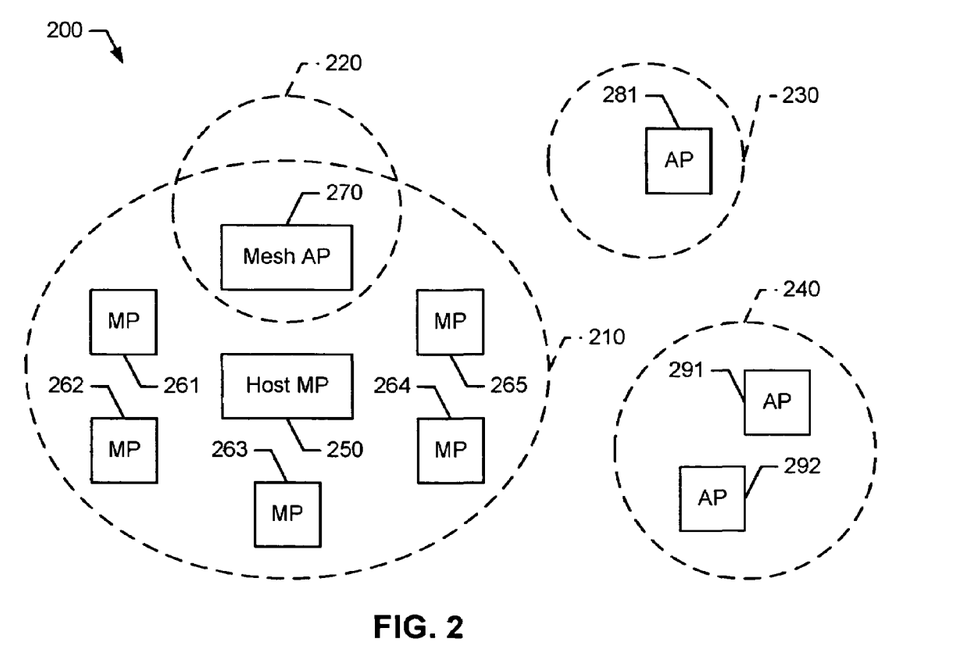
FIG. 2 is a block diagram representation of an example channel selection system.

In the example of FIG. 2, a channel selection system 200 may include two or more wireless communication networks, generally shown as 210, 220, 230, and 240. In particular, the channel selection system 200 may include a wireless mesh network 210 and/or a non-wireless mesh network such as a BSS network, generally shown as 220, 230, and 240. Although FIG. 2 depicts four wireless communication networks, the channel selection system 200 may include additional or fewer wireless communication networks. In particular, the channel selection system 200 may include additional or fewer BSS networks while FIG. 2 depicts three BSS networks. Further, the channel selection system 200 may include additional wireless mesh networks while FIG. 2 depicts one wireless mesh network.

Each of the wireless communication networks 210, 220, 230, and 240 of the channel selection system 200 may be a neighboring network relative to each other. For example, the wireless mesh network 210 and the BSS networks 220, 230, and 240 may be neighboring networks to each other. As neighboring networks, the wireless mesh network 210 and the BSS networks 220, 230, and 240 may contend for the same communication channels for communication.

Figure 3:
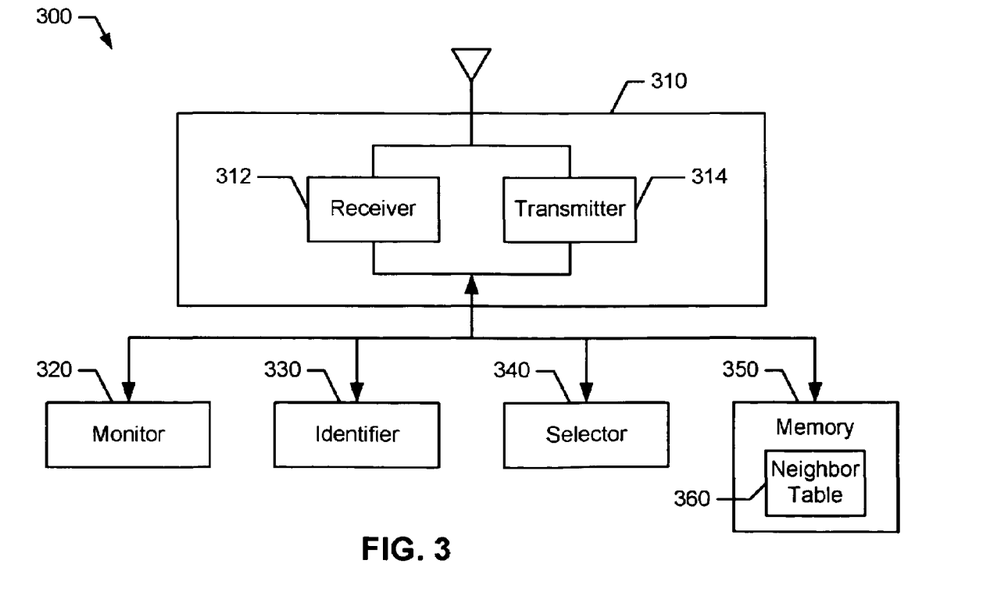
FIG. 3 is a block diagram representation of an example communication node.

Each of the wireless communication networks 210, 220, 230, and 240 may include one or more communication nodes (e.g., the communication node 300 of FIG. 3). In one example, the wireless mesh network 210 may include two or more MPs, generally shown as 250, 261, 262, 263, 264, 265, and 270. Each of the BSS networks 220, 230, and 240 may include one or more APs, generally shown as 270, 281, 291, and 292. In addition to operating as an AP within the BSS network 220, the AP 270 may operate as a mesh AP (e.g., an MP of a wireless mesh network and an AP of a BSS network). In particular, the mesh AP 270 may receive and/or transmit data in connection with one or more of the plurality of MPs 250, 261, 262, 263, 264, and 265 of the wireless mesh network 210. Each of the MPs 250, 261, 262, 263, 264, and 265, the APs 281, 291, and 292, and the mesh AP 270 may be neighboring communication nodes relative to each other. As neighboring communication nodes, the MPs 250, 261, 262, 263, 264, and 265, the APs 281, 291, and 292, and the mesh AP 270 may contend for the same communication channels for communication.

Referring to FIG. 3, a communication node 300 may include a communication interface 310, a monitor 320, an identifier 330, a selector 340, and a memory 350. The communication interface 310 may include a receiver 312 and a transmitter 314.

The communication interface 310 may receive and/or transmit traffic associated with wireless communication networks including mesh networks (e.g., the wireless mesh network 210 of FIG. 2) and/or non-mesh networks (e.g., the BSS networks 220, 230, and 240 of FIG. 2). In particular, the receiver 312 may receive channel load information associated with other MPs, APs, and/or mesh APs within the same wireless communication network and/or neighboring wireless communication networks. For example, the channel load information may include the channel idle fraction and/or the maximum channel capacity of the communication channel. The transmitter 314 may transmit channel load information associated with the communication node 300 to other MPs, APs, and/or mesh APs within the same wireless communication network and/or neighboring wireless communication networks. For example, the AP 291 of FIG. 2 may communicate channel load information with the AP 292 of the BSS network 240, the AP 281 of the BSS network 230, and the mesh AP 270 of the BSS 220 and the wireless mesh network 210.

The monitor 320 may be operatively coupled to the communication interface 310 and configured to monitor for a trigger event to select a communication channel based on channel load information. In one example, the communication node 300 may select a communication channel to use during start up. In another example, the communication node 300 may switch from using a first communication channel to a second communication channel by selecting the second communication channel in response to detecting a condition indicative of interference associated with the first communication channel. In particular, the monitor 320 may determine that the signal-to-interference ratio is below a threshold level to provide suitable communication services.

The identifier 330 may be operatively coupled to the communication interface 310 and configured to identify load conditions associated with a plurality of communication channels based on the channel load information. Further, the identifier 330 may identify one or more neighboring networks with one or more communication nodes transmitting channel load information to the communication node 300. As noted above, neighboring networks may be wireless communication networks contending for the same communication channel. Based on the channel load information, the identifier 330 may generate a neighbor table 360 to track the plurality of communication channels used and/or associated with neighboring networks.

The selector 340 may be operatively coupled to the identifier 330 and the memory 350. As described in detail below, the selector 340 may select a communication channel to use by the communication node 300 for communication based on the load conditions identified by the identifier 340.

The memory 350 may store channel load information of the communication node 300 and/or other communication nodes in the same wireless communication network and/or neighboring wireless communication network(s). The memory 350 may also store the neighbor table 360.

While the components shown in FIG. 3 are depicted as separate blocks within the communication node 300, the functions performed by some of these blocks may be integrated within a single semiconductor circuit or may be implemented using two or more separate integrated circuits. For example, although the receiver 312 and the transmitter 314 are depicted as separate blocks within the radio interface 310, the receiver 312 may be integrated into the transmitter 314 (e.g., a transceiver). The methods and apparatus described herein are not limited in this regard.

Figure 4:
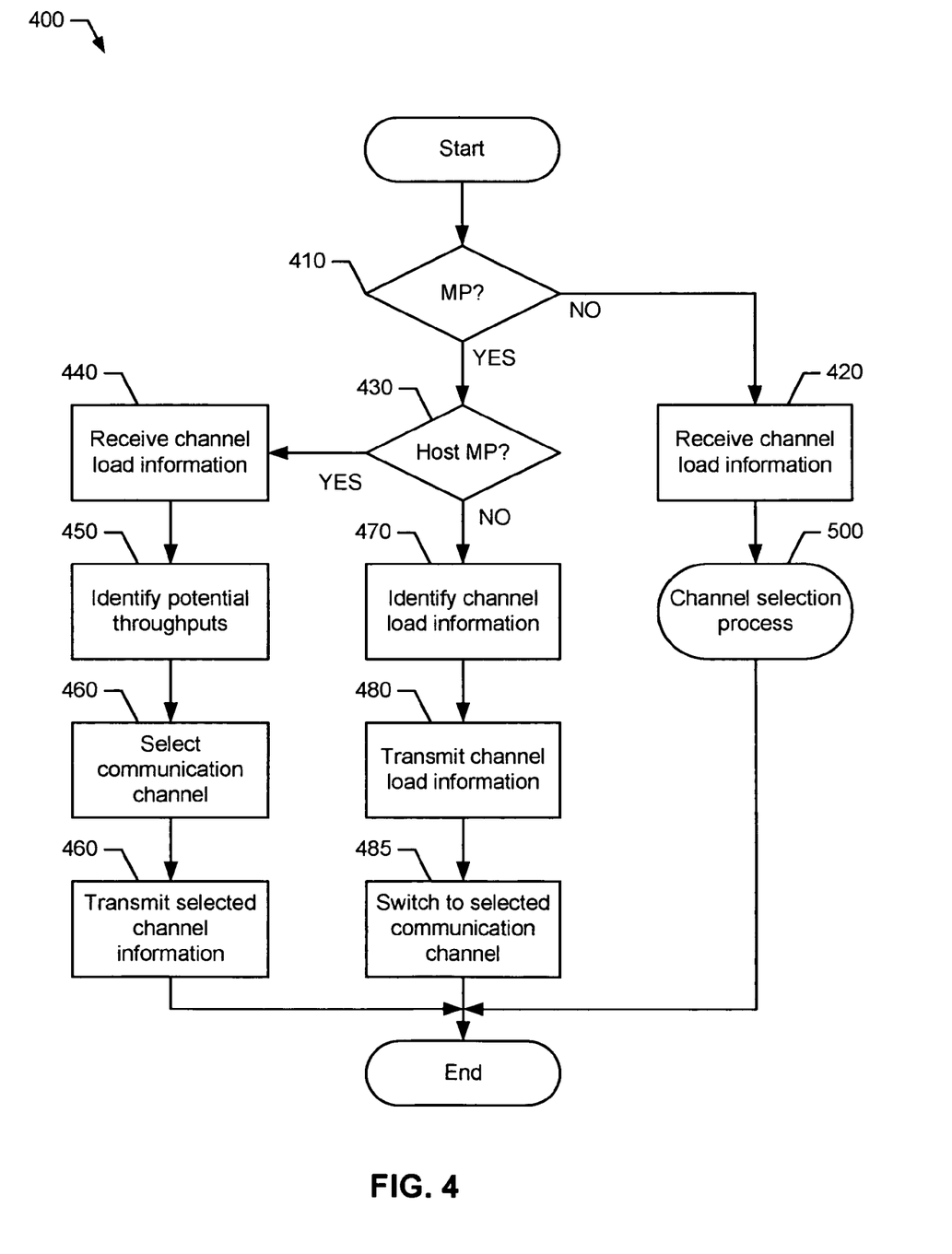
FIG. 4 is a flow diagram representation of one manner in which an example communication node of FIG. 3 may be configured to implement the channel selection system of FIG. 2.
Figure 5:
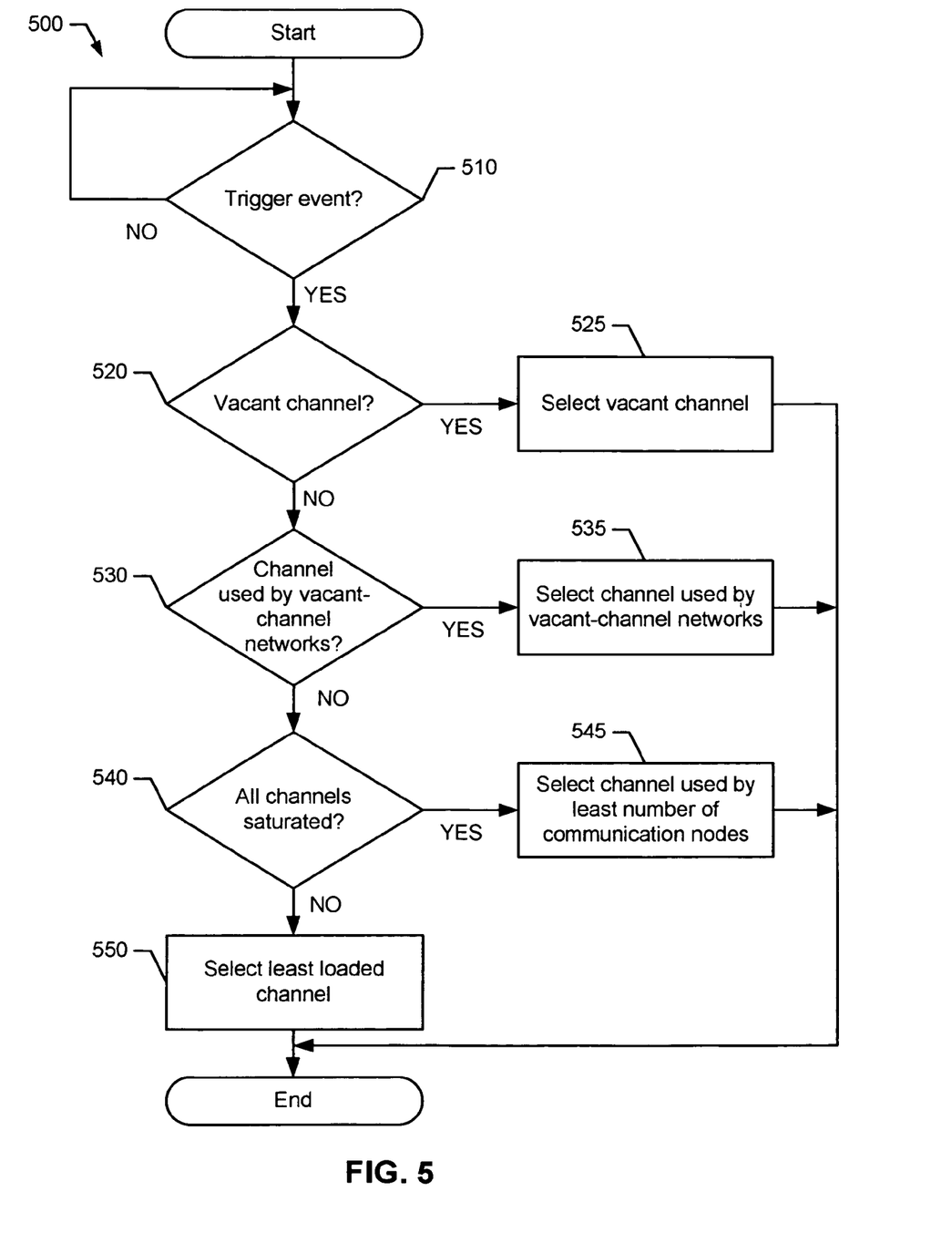
FIG. 5 is a flow diagram representation of one manner in which an example communication node of FIG. 3 may be configured to select a communication channel.

To reduce interference between wireless communication networks, the communication node 300 may use a communication channel based on channel load information. In particular, FIGS. 4 and 5 depict one manner in which the example communication node 300 of FIG. 3 may be configured to select communication channels based on channel load information. The example processes 400 and 500 of FIGS. 4 and 5, respectively, may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIGS. 4 and 5, these actions can be performed in other temporal sequences. Again, the example processes 400 and 500 are merely provided and described in conjunction with the apparatus of FIGS. 2 and 3 as an example of one way to configure a communication node to select a communication channel based on channel load information. The methods and apparatus described herein are not limited in this regard.

In the example of FIG. 4, the process 400 may begin with the communication node 300 determining whether the communication node 300 is an MP of a wireless mesh network (block 410). As noted above, the communication node 300 may be an MP of a wireless mesh network (e.g., any one of the MPs 250, 261, 262, 263, 264, and 265 of FIG. 2), an AP of a BSS network (e.g., any one of the APs 281, 291, and 292 of FIG. 2), or a mesh AP (e.g., the mesh AP 270 of FIG. 2).

If the communication node 300 is not an MP of a wireless mesh network (e.g., any one of the APs 281, 291, and 292 of FIG. 2), the communication node 300 may receive channel load information to select a communication channel for communication of the wireless communication network associated with the communication node 300 (block 420). In particular, the communication node 300 may receive channel load information in a passive manner by monitoring for transmission of channel load information from other communication nodes associated with the same wireless communication network and/or neighboring wireless communication network(s). For example, the AP 291 of the BSS network 240 may monitor for transmission of channel load information from the AP 292, the AP 281 of the BSS network 230, the host MP 250 of the wireless mesh network 210, and/or the mesh AP 270 of the BSS network 220. In addition or alternatively, the communication node 300 may receive channel load information in a proactive manner by requesting for the channel load information from other communication nodes associated with the same wireless communication network and/or neighboring wireless communication network(s). Following the above example, the AP 291 may request for channel load information from the AP 292, the AP 281, the host MP 250, and/or the mesh AP 270. Accordingly, the communication node 300 may proceed to the channel selection process 500 of FIG. 5 to select a channel for communication.

Turning to FIG. 5, the process 500 may begin with the communication node 300 (e.g., via the monitor 310) monitoring for a trigger event to initiate the selection of a channel for communication of the wireless communication network associated with the communication node 300 (block 510). In one example, the communication node 300 may select a communication channel during an initialization phase of the communication node 300 (e.g., during boot up and/or when the communication node 300 is powered up). The communication node 300 may also switch from communicating on a first communication channel to a second communication channel. In particular, the communication node 300 may initiate the selection of a communication channel in response to detecting a condition indicative of interference associated with a communication channel currently being used by the communication node 300 and/or other communication nodes and/or stations of the wireless communication network associated with the communication node 300. For example, the communication node 300 may detect that the signal-to-interference ratio associated with the current communication channel is below a predefined threshold level. Accordingly, the communication node 300 may select a different channel for communication of the wireless communication network associated with the communication node 300.

If the communication node 300 does not detect a trigger event to select a communication channel, the communication node 300 may return to block 510 and continue to monitor for a trigger event. Otherwise if the communication node 300 detects a trigger event to select a communication channel, the communication node 300 may determine whether a vacant channel is available for communication of the wireless communication network associated with the communication node 300 (block 520). In particular, the communication node 300 may determine whether there is a communication channel that is not used by communication nodes for communication of any neighboring wireless communication networks. By selecting a vacant channel, the communication node 300 may minimize interference on communication of the wireless communication network associated with the communication node 300. In one example, the AP 281 may determine whether there is a communication channel that is not used by the wireless mesh network 210 and the BSS networks 220 and 240. In another example, the AP 291 may determine whether there is a communication channel that is not used by the wireless mesh network 210 and the BSS networks 220 and 230.

If a vacant channel is available, the communication node 300 may select the vacant channel for communication of the wireless communication network associated with the communication node 300 (block 525). In one example, the AP 281 may identify and select a vacant channel for communication of the BSS network 230. In another example, the AP 291 and/or the AP 292 may identify and select a vacant channel for communication of the BSS network 240.

Otherwise if the communication node 300 determines at block 520 that there are no vacant channels available, the communication node 300 may determine whether a communication channel associated with vacant-channel networks is available for communication by a wireless communication network associated with the communication node 300 (block 530). In particular, a vacant-channel network may be a wireless communication network having one or more vacant channels. Accordingly, the communication node 300 may determine whether all the wireless communication networks using a particular communication channel are vacant-channel networks. A vacant-channel network may be configured to switch from one vacant channel to another vacant channel in response to detecting that another wireless communication network selected to the vacant channel used by the vacant-channel network.

If a communication channel used by vacant-channel network(s) only is available, the communication node 300 may select that communication channel for communication by the wireless communication network associated with the communication node 300 (block 535). In one example, the mesh AP 270 of the BSS 220 and the APs 291 and 292 of the BSS network 240 may be using Channel 1 for communication but the mesh AP 270 and the APs 291 and 292 may use either Channels 6 or 11. Based on channel load information from the mesh AP 270 and the APs 291 and 292 and a corresponding neighbor table (e.g., the neighbor table 360 of FIG. 3), the AP 281 of the BSS network 230 may determine that the BSS networks 220 and 240 may use another vacant channel (e.g., Channel 6 or Channel 11). Accordingly, the AP 281 may select Channel 1 for the BSS network 230 to use for communication because the BSS networks 220 and 240 may switch to either Channel 6 or 11 for communication.

Otherwise if the communication node 300 determines at block 530 that there is no communication channel used by vacant-channel network(s) only available, the communication node 300 may determine whether all communication channels used by the wireless communication network associated with the communication node 300 and neighboring wireless communication networks are saturated (block 540). A communication channel may be saturated when there is no available bandwidth or the amount of bandwidth available is below a predefined threshold level. In one example, the available bandwidth of a communication channel used by communication node(s) other than the communication node 300 may be represented by $U_1=P*C$, where P is the channel idle fraction and C is the maximum channel capacity of the communication channel. The available bandwidth of a communication channel used by the communication node 300 may be represented by $U_2=(P*C)+B$, where B is the average bandwidth of the communication channel used by the wireless communication network associated with the communication node 300. Initially at start up, the communication node 300 may use an estimated average bandwidth B. Otherwise, the communication node 300 may measure the average bandwidth B of the wireless communication network associated with the communication node 300.

If the communication node 300 determines at block 540 that all communication channels are saturated (e.g., all bandwidth of all the communication channels are used), the communication node 300 may select a communication channel used by the least number of communication nodes (block 545). Based on the neighbor table 360, the communication node 300 may select a communication channel used by the least number of communication nodes. In one example, the host MP 250 of the wireless mesh network 210 may be using Channel 1, the mesh AP 270 of the BSS network 220 may be using Channel 6, and the APs 291 and 292 of the BSS network 240 may be using Channel 11. Accordingly, the AP 281 of the BSS network 230 may select either Channel 1 or Channel 6 for communication because only one communication node is using Channel 1 or Channel 6 (e.g., the host MP 250 and the mesh AP 270, respectively) whereas two communication nodes are using Channel 11 (e.g., the APs 291 and 292). The communication node 300 may achieve better performance and/or encounter less interference by sharing a communication channel with less communication nodes.

If the communication node 300 determines at block 540 that one or more communication channels are not saturated, the communication node 300 may select the least loaded channel (block 550). In particular, the communication node 300 may determine the vacant bandwidth of each communication channel that may be selected by the communication node 300 (e.g., $U_1$ and $U_2$). The communication node 300 may achieve better performance and/or encounter less interference by sharing a communication channel with the greatest amount of vacant bandwidth among the plurality of communication channels. The methods and apparatus described herein are not limited in this regard.

Referring back to block 410 of FIG. 4, if the communication node 300 is an MP of a wireless mesh network, the communication node 300 may determine whether the communication node 300 is a host MP (e.g., the host MP 250 of FIG. 2) (block 430). In particular, the host MP may be configured to collect channel load information from other MPs of a wireless mesh network and select a communication channel for communication of the wireless mesh network. For example, the host MP 250 of the wireless mesh network 210 may collect channel load information from the MPs 261, 262, 263, 264, 265, and 270, and select a communication channel for communication of the wireless mesh network 210.

The MPs of the wireless mesh network 210 may automatically select one of the MPs to operate as the host MP 250. The MPs of the wireless mesh network 210 may use a variety of hierarchical schemes to designate the host MP 250 based on characteristics of the MPs of the wireless mesh network 210. In one example, the MPs of the wireless mesh network 210 may select one of the MPs to operate as the host MP 250 based on which one of the MPs is currently being used or was last used. In another example, each of the MPs may take turn to operate as the host MP 250 for a predefined time period in a round-robin manner (e.g., a duty cycle of one hour). Alternatively, an individual may manually designate one of the MPs as the host MP 250. Although the above examples disclose designating one of the MPs of the wireless mesh network 210 as the host MP 250, two or more of the MPs may be designated as host MPs. The methods and apparatus described herein are not limited in this regard.

If the communication node 300 is designated to operate as a host MP of a wireless mesh network, the communication node 300 may proceed to block 420 to receive channel load information from the other MPs of the wireless mesh network (block 440). In a proactive manner, for example, the host MP 250 may request for channel load information from the other MPs 261, 262, 263, 264, 265, and 270 of the wireless mesh network 210. In addition or alternatively, the host MP 250 may receive the channel load information in a passive manner by monitoring for transmissions from the other MPs 261, 262, 263, 264, 265, and 270 of the wireless mesh network 210.

Based on the channel load information, the communication node 300 may identify the potential throughput associated with each of the plurality of communication channels (block 450). As described in detail below, for example, the host MP 250 may identify the potential throughput associated with each of the plurality of communication channels by adding the potential throughput associated with each of the plurality of communication channels from each of the MPs 261, 262, 263, 264, 265, and 270. The communication node 300 may select a communication channel for communication of the wireless mesh network based on the potential throughputs of the plurality of communication channels (block 460). For example, the host MP 250 may select a communication channel associated with the greatest level of potential throughput among the plurality of communication channels.

Accordingly, the communication node 300 may inform other communication nodes of the wireless mesh network of the newly selected communication channel. The communication node 300 may transmit selected channel information indicative of the newly selected communication channel to other communication node(s) of the wireless mesh network (block 465). In one example, the host MP 250 may transmit selected channel information to the MPs 261, 262, 263, 264, 265, and 270 so that each of the MPs 261, 262, 263, 264, 265, and 270 may switch to and operate on the newly selected communication channel for communication of the wireless mesh network 210. The methods and apparatus described herein are not limited in this regard.

Alternatively, if the communication node 300 is designated as the host MP at block 430, the communication node 300 may proceed to block 420 to receive channel load information from the other MPs of the wireless mesh network. For example, the host MP 250 may receive channel load information from the MPs 261, 262, 263, 264, 265, and 270 of the wireless mesh network 210. Based on the channel load information, the host MP 250 may proceed to select a communication channel for the wireless mesh network 210 as described above in the connection with the channel selection process 500 of FIG. 5.

Turning back to block 430, if the communication node 300 is not designated to operate as a host MP, the communication node 300 may identify channel load information for the host MP (block 470). In one example, each of the MPs 261, 262, 263, 264, 265, and 270 may collect the channel idle fraction and the maximum channel capacity for each channel of the wireless mesh network 210. The channel idle fraction may be indicative of an amount of bandwidth of a communication channel that is idle (e.g., available).

Based on the channel idle fraction and the maximum channel capacity, each of the MPs 261, 262, 263, 264, 265, and 270 may determine a potential throughput of each of the plurality of communication channels. For example, the potential throughput of a communication channel other than the communication channel used by the MP may be represented by $T_1 = U_1/(N+1)$, where $U_1$ is the available bandwidth of the communication channel unused by the MP and N is a number of neighboring communication nodes. The potential throughput of the communication channel used by the MP may be represented by $T_2 = U_2/(N+1)$, where $U_2$ is the available bandwidth of the communication channel used by the MP.

In a similar manner as in the BSS network 230, the available bandwidth of a communication channel of the wireless mesh network 210 used by communication node(s) other than the communication node 300 may be represented by $U_1 = P*C$, where P is the channel idle fraction and C is the maximum channel capacity of the communication channel. The available bandwidth of a communication channel of the wireless mesh network 210 used by the communication node 300 may also be represented by $U_2 = (P*C) + B$, where B is the average bandwidth of the communication channel used by the wireless communication network associated with the communication node 300.

Accordingly, the communication node 300 may transmit the channel load information to the host MP (block 480). In one example, each of the MPs 261, 262, 263, 264, 265, and 270 may automatically transmit the channel load information to the host MP 250. In another example, each of the MPs 261, 262, 263, 264, 265, and 270 may transmit the channel load information to host MP 250 in response to a request by the host MP 250.

As noted above, the host MP 250 may inform each of the MPs 261, 262, 263, 264, 265, and 270 of the newly selected communication channel for communication of the wireless mesh network 210 (e.g., block 465). In particular, each of the MPs 261, 262, 263, 264, 265, and 270 may receive the selected channel information from the host MP 250. Based on the selected channel information, the communication node 300 may switch to and operate on the newly selected communication channel for communication of the wireless mesh network 210 (block 485). The methods and apparatus described herein are not limited in this regard.

Figure 6:
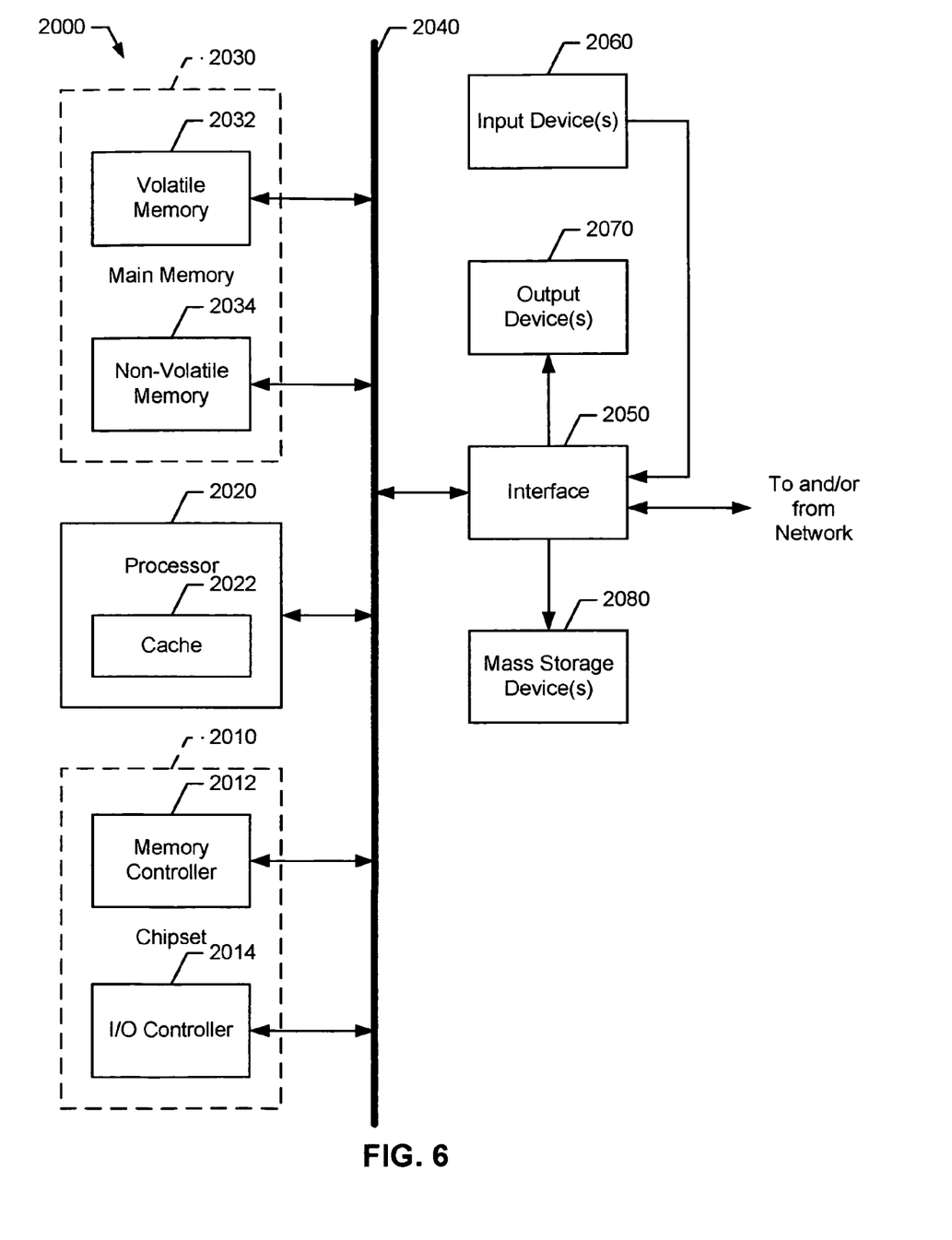
FIG. 6 is a block diagram representation of an example processor system that may be used to implement the example communication node of FIG. 3.

FIG. 6 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 6 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
    identifying, by a communication node, load conditions of a plurality of communication channels associated with a wireless communication network of the communication node and a neighboring communication network of the communication node, wherein the load conditions are identified based on channel load information; and
    selecting, by the communication node, a first communication channel of the plurality of communication channels for communication of the wireless communication network based on the load conditions, said selecting including:
        determining whether the neighboring communication network using a current communication channel has at least one vacant communication channel available, wherein the current communication channel is different than the vacant communication channel and the determination is made in response to a determination that no vacant communication channel is available within the wireless communication network; and
        selecting, by the communication node, the current communication channel being used by the neighboring communication network as the first communication channel based at least in part on the determination that the neighboring communication network has at least one vacant communication channel.

2. A method as defined in claim 1, wherein identifying load conditions associated with the plurality of communication channels at the communication node comprises identifying load conditions of the plurality of communication channels at one of an access point of a basic service set network or a mesh point of a wireless mesh network.

3. A method as defined in claim 1, wherein selecting one of the plurality of communication channels for communication of the wireless communication network based on the load conditions comprises selecting a communication channel associated with the least number of communication nodes among the plurality of communication channels.

4. A method as defined in claim 1, wherein selecting one of the plurality of communication channels for communication for the wireless communication network based on the load conditions comprises selecting a communication channel associated with one of the greatest amount of vacant bandwidth or the greatest level of potential throughput among the plurality of communication channels.

5. A method as defined in claim 1, wherein selecting one of the plurality of communication channels for communication for the one of the plurality of wireless communication networks based on the load conditions comprises switching from a first communication channel to a second communication channel based on the load conditions.

6. A method as defined in claim 1 further comprising transmitting selected channel information indicative of the one of the plurality of communication channels from a first communication node to a second communication node.

7. A method as defined in claim 1, wherein identifying load conditions of the plurality of communication channels at the communication node comprises receiving the channel load information associated with the plurality of communication channels at the communication node from another communication node.

8. A computer-readable storage medium including computer readable instructions that, if executed by a computer system, causes the system to:
identify load conditions of a plurality of communication channels associated with a wireless communication network and a neighboring communication network based on channel load information; and
select a first communication channel of the plurality of communication channels for communication of the wireless communication network based on the load conditions, said select including:
determining whether the neighboring communication network using a current communication channel has at least one vacant communication channel available, wherein the current communication channel is different than the vacant communication channel and the determination is made in response to a determination that no vacant communication channel is available within the wireless communication network; and
selecting the current communication channel being used by the neighboring communication network as the first communication channel based at least in part on the determination that the neighboring communication network has at least one vacant communication channel.

9. The machine-readable medium of claim 8, wherein the content, when accessed, causes the system to identify load conditions of the plurality of communication channels at the communication node by identifying load conditions of the plurality of communication channels at one of an access point of a basic service set network or a mesh point of a wireless mesh network.

10. The machine-readable medium of claim 8, wherein the content, when accessed, causes the system to select one of the plurality of communication channels for communication of the wireless communication network based on the load conditions by selecting a communication channel associated with the least number of communication nodes among the plurality of communication channels.

11. The machine-readable medium of claim 8, wherein the content, when accessed, causes the system to select one of the plurality of communication channels for communication of the wireless communication networks based on the load conditions by selecting a communication channel associated with one of the greatest amount of vacant bandwidth or the greatest level of potential throughput among the plurality of communication channels.

12. The machine-readable medium of claim 8, wherein the content, when accessed, causes the system to transmit selected channel information indicative of the one of the plurality of communication channels from a first communication node to a second communication node.

13. The computer-readable storage medium of claim 8, wherein the content, when accessed, causes the system to identify load conditions of the plurality of communication channels at the communication node by receiving the channel load information associated with the plurality of communication channels at the communication node from another communication node.

14. An apparatus comprising:
a communication interface to receive channel load information;
an identifier coupled to the communication interface to identify load conditions of a plurality of communication channels associated with a wireless communication network of the apparatus and neighboring communication network of the apparatus, wherein the load conditions are identified based on the channel load information; and
a selector coupled to the identifier to select a first channel of the plurality of communication channels for communication of the wireless communication network based on the load conditions, said selector comprising a processor configured to select by determining whether the neighboring communication network using current communication channel has at least one vacant communication channel available, wherein the current communication channel is different than the vacant communication channel and the determination is made in response to a determination that no vacant channel is available within the wireless communication network, and selecting the current communication channel being used by the neighboring communication network as the first communication channel based at least in part on the determination that the neighboring communication network has at least one vacant communication channel.

15. An apparatus as defined in claim 14, wherein the selector is configured to select a vacant channel.

16. An apparatus as defined in claim 14, wherein the selector is configured to select a communication channel associated with the least number of communication nodes among the plurality of communication channels.

17. An apparatus as defined in claim 14, wherein the selector is configured to select a communication channel associated with one of the greatest amount of vacant bandwidth or the greatest level of potential throughput among the plurality of communication channels.

18. An apparatus as defined in claim 14, wherein the communication interface is configured to transmit selected channel information indicative of the one of the plurality of communication channels from a first communication node to a second communication node.

19. An apparatus as defined in claim 14, wherein the communication node is one of an access point of a basic service set network or a mesh point of a wireless mesh network.

20. An apparatus as defined in claim 14, wherein said identifier to identify the load conditions of the plurality of communication channels at the communication node by receiving the channel load information associated with the plurality of communication channels at the communication node from another communication node.

21. A system comprising:
a flash memory; and
a processor coupled to the flash memory to identify load conditions of a plurality of communication channels associated with a wireless communication network and a neighboring communication network, wherein said processor is configured to identify the load conditions based on channel load information, and to select a first channel of the plurality of communication channels for communication of the wireless communication network based on the load conditions, said select including determining whether the neighboring communication network using a current communication channel has at least one vacant communication channel available, wherein the current communication channel is different than the vacant communication channel and the determination is made in response to a determination that no vacant channel is available within the wireless communication network, and selecting the current communication channel being used by the neighboring wireless communication network as the first communication channel based at least in part on the determination that the neighboring communication network has at least one vacant communication channel.

22. A system as defined in claim 21, wherein the processor is configured to select a communication channel used by the least number of communication nodes among the plurality of communication channels.

23. A system as defined in claim 21, wherein the processor is configured to select a communication channel associated with one of the greatest amount of vacant bandwidth or the greatest level of potential throughput among the plurality of communication channels.

24. A system as defined in claim 21, wherein the processor is configured to transmit selected channel information indicative of the one of the plurality of communication channels from a first communication node to a second communication node.

25. A system as defined in claim 21, wherein said identifying the load conditions of the plurality of communication channels at the communication node comprises receiving the channel load information associated with the plurality of communication channels at the communication node from another communication node.

* * * * *